US010555263B2

(12) United States Patent
Xia et al.

(10) Patent No.: US 10,555,263 B2
(45) Date of Patent: Feb. 4, 2020

(54) UPLINK SIGNAL TRANSMIT POWER CONTROL

(71) Applicant: Futurewei Technologies, Inc., Plano, TX (US)

(72) Inventors: Pengfei Xia, San Diego, CA (US); Bin Liu, San Diego, CA (US); Richard Stirling-Gallacher, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 40 days.

(21) Appl. No.: 15/821,319

(22) Filed: Nov. 22, 2017

(65) Prior Publication Data

US 2018/0192375 A1   Jul. 5, 2018

Related U.S. Application Data

(60) Provisional application No. 62/442,846, filed on Jan. 5, 2017.

(51) Int. Cl.
*H04B 5/00* (2006.01)
*H04W 52/14* (2009.01)
(Continued)

(52) U.S. Cl.
CPC ......... *H04W 52/146* (2013.01); *H04W 52/32* (2013.01); *H04W 52/367* (2013.01); *H04B 7/0617* (2013.01); *H04W 52/54* (2013.01)

(58) Field of Classification Search
CPC . H04W 50/146; H04W 52/32; H04W 52/367; H04B 7/088; H04B 7/0695
See application file for complete search history.

(56) References Cited

U.S. PATENT DOCUMENTS

2013/0029657 A1*  1/2013  Gao .................... H04W 74/004
                                                          455/422.1
2013/0163544 A1*  6/2013  Lee ....................... H04W 72/04
                                                          370/329
(Continued)

FOREIGN PATENT DOCUMENTS

CN      101998596 A      3/2011
CN      105307254 A      2/2016
(Continued)

OTHER PUBLICATIONS

Interdigital Communications, "Beam-based aspects for New Radio", 3GPP TSG-RAN WG2 #96, Reno, USA, Nov. 14-18, 2016, R2-168466 (Update to R2-167137), total 4 pages.

*Primary Examiner* — Md K Talukder
(74) *Attorney, Agent, or Firm* — Slater Matsil, LLP

(57) ABSTRACT

A method for controlling an uplink signal transmit power at the user equipment and a UE configured to perform such a method are disclosed. In an embodiment, the method includes receiving a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting an uplink signal associated with a fifth resource indicator to a transmission point with a transmit power calculated based on the combination, wherein the downlink reference signal transmit power associated with the first resource indicator and the downlink reference signal transmit beamforming gain associated with the second resource indicator are signaled together as a single metric associated with a sixth resource indicator.

38 Claims, 3 Drawing Sheets

(51) Int. Cl.
*H04W 52/32* (2009.01)
*H04W 52/36* (2009.01)
H04W 52/54 (2009.01)
H04B 7/06 (2006.01)

(56) References Cited

U.S. PATENT DOCUMENTS

| | | | |
|---|---|---|---|
| 2013/0201938 A1* | 8/2013 | Seol | H04W 72/1284 370/329 |
| 2013/0301454 A1* | 11/2013 | Seol | H04B 7/043 370/252 |
| 2014/0185481 A1* | 7/2014 | Seol | H04W 52/42 370/252 |
| 2016/0087765 A1* | 3/2016 | Guey | H04L 27/2607 370/330 |
| 2016/0227519 A1* | 8/2016 | Nimbalker | H04L 5/0094 |
| 2016/0269093 A1* | 9/2016 | Seol | H04B 7/043 |
| 2017/0366311 A1* | 12/2017 | Iyer | H04B 7/0482 |
| 2018/0070316 A1* | 3/2018 | Sun | H04W 52/10 |
| 2018/0070321 A1* | 3/2018 | Hessler | H04W 52/241 |
| 2018/0175983 A1* | 6/2018 | Yum | H04L 5/0057 |
| 2019/0058561 A1* | 2/2019 | Ho | H04B 7/0695 |

FOREIGN PATENT DOCUMENTS

| | | |
|---|---|---|
| WO | 2013119166 A1 | 8/2013 |
| WO | 2016167692 A1 | 10/2016 |

\* cited by examiner

UPLINK SIGNAL TRANSMIT POWER CONTROL

CROSS-REFERENCE TO RELATED APPLICATIONS

This application claims the benefit of U.S. Provisional Application No. 62/442,846, filed on Jan. 5, 2017, which application is hereby incorporated herein by reference in its entirety.

TECHNICAL FIELD

The present disclosure relates generally to a system and method for wireless communication, and, in particular embodiments, to a system and method for a transmit power control.

BACKGROUND

Beamforming is a signal processing technique for directional signal transmission or reception. This is achieved by combining antennas in a phased array in such a way that signals at particular angles experience constructive interference while others experience destructive interference. Beamforming can be used at both the transmitting and receiving ends in order to achieve spatial selectivity. The improvement compared with omnidirectional reception or transmission is known as the directivity of the antenna.

SUMMARY

In accordance with an embodiment of the present disclosure a method for controlling an uplink signal transmit power at a user equipment (UE) is disclosed. The method includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the downlink reference signal transmit power associated with the first resource indicator and the downlink reference signal transmit beamforming gain associated with the second resource indicator are signaled together as a single metric associated with a sixth resource indicator.

In accordance with an embodiment of the present disclosure, a method for an uplink signal transmit power control at a user equipment (UE) is disclosed. The method includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the downlink reference signal transmit beamforming gain associated with the second resource indicator and the uplink signal receive beamforming gain associated with the third resource indicator are signaled together as a single metric associated with a sixth resource indicator.

In accordance with an embodiment of the present disclosure, a method for an uplink signal transmit power control at a user equipment (UE) is disclosed. The method includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination,
wherein the uplink signal receive beamforming gain associated with the third resource indicator and the uplink signal target receive power associated with the fourth resource indicator are signaled together as a single metric associated with an sixth resource indicator.

In accordance with an embodiment of the present disclosure, a method for an uplink signal transmit power control at a user equipment (UE) is disclosed. The method includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the uplink signal target receive power associated with the fourth resource indicator and the downlink reference signal transmit power associated with the first resource indicator are signaled together as a single metric associated with a sixth resource indicator.

In accordance with an embodiment of the present disclosure, a user equipment (UE) is disclosed. The UE includes a memory storage comprising instructions and one or more processors in communication with the memory storage, wherein the one or more processors execute the instructions to: receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination,
wherein the downlink reference signal transmit power associated with the first resource indicator and the downlink reference signal transmit beamforming gain associated with the second resource indicator are signaled together as a single metric associated with a sixth resource indicator.

In accordance with an embodiment of the present disclosure, a user equipment (UE) is disclosed. The UE includes a memory storage comprising instructions and one or more processors in communication with the memory storage, wherein the one or more processors execute the instructions to: receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the downlink reference signal transmit beamforming gain associated with the second resource indicator and the uplink signal receive beamforming gain associated with the third resource indicator are signaled together as a single metric associated with a sixth resource indicator.

In accordance with an embodiment of the present disclosure, a user equipment (UE) is disclosed. The UE includes a memory storage comprising instructions and one or more processors in communication with the memory storage, wherein the one or more processors execute the instructions to: receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the uplink signal receive beamforming gain associated with the third resource indicator and the uplink signal target receive power associated with the fourth resource indicator are signaled together as a single metric associated with an sixth resource indicator.

In accordance with an embodiment of the present disclosure, a user equipment (UE) is disclosed. The UE includes a memory storage comprising instructions and one or more processors in communication with the memory storage, wherein the one or more processors execute the instructions to: receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and transmitting, by the UE, an uplink signal associated with a fifth resource indicator to a transmission point (TRP) with a transmit power calculated based on the combination, wherein the uplink signal target receive power associated with the fourth resource indicator and the downlink reference signal transmit power associated with the first resource indicator are signaled together as a single metric associated with a sixth resource indicator.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

For wireless communications, beamforming (BF) is usually provided at the transmitter or receiver side of an air interface to bridge insufficient link budget. Usually, a large beamforming gain at the transmitter and the receiver is desired.

Embodiments of the disclosure enable a UE (user equipment or mobile device) to calculate or control the transmit power by taking into account a transmit antenna beamforming gain and a receive antenna beamforming gain.

Embodiments of the disclosure are advantageous because they enable the UE to more efficiently control the transmit power. Efficient control of the transmit power Quality of Service (QoS) can be obtained while power consumption can be reduced and battery life can be increased. Moreover, these embodiments reduce interference with (nearby) UEs or (nearby) other users. The UE further benefits from the large directional transmit antenna/beamforming gain at the UE and the transmission point (TRP). Conventional solutions do not provide transmit antenna beamforming gain and receive antenna beamforming gain according to embodiments of the disclosure.

In conventional systems the UE transmit power was calculated as follows:

$$UE \text{ transmit power} = \underbrace{P_0 + \alpha \cdot PL}_{\text{basic open-loop operating point}} + \underbrace{\Delta_{TF} + f(\Delta_{TPC})}_{\text{dynamic offset}} + \underbrace{10 \log_{10} M}_{\text{bandwidth factor}}$$

In this formula $P_0$ is the eNB's target received power per resource block (RB) assuming 0 dB path loss (PL), PL is the estimated downlink path loss, $\alpha$ is the factor to enable or disable fractional power control, $\Delta_{TF}$ is the modulation and coding scheme, $f(\Delta_{TPC})$ is the closed loop component of power control and M is the number of assigned RBs.

For the UE transmit power, the UE will set up an operating point of a target power to be received by the eNB in the uplink (UL) in an open loop power control. In order to account for any effects such as fading, etc. the closed loop portion $f(\Delta_{TPC})$ provides some compensation. The PL is estimated by the UE by measuring a reference signal sent by the eNB. In a beam based system, PL estimation is beam-pair based. Here a beam pair corresponds to a TRP transmit beam and a UE receive beam or a UE transmit beam and a TRP receive beam. $P_0$ and $\alpha$ are signaled (e.g., via SystemInformationBlock Type 2 (SIB2) Radio Resource Control (RRC) messaging) and M is provided by the network.

Figure 1:
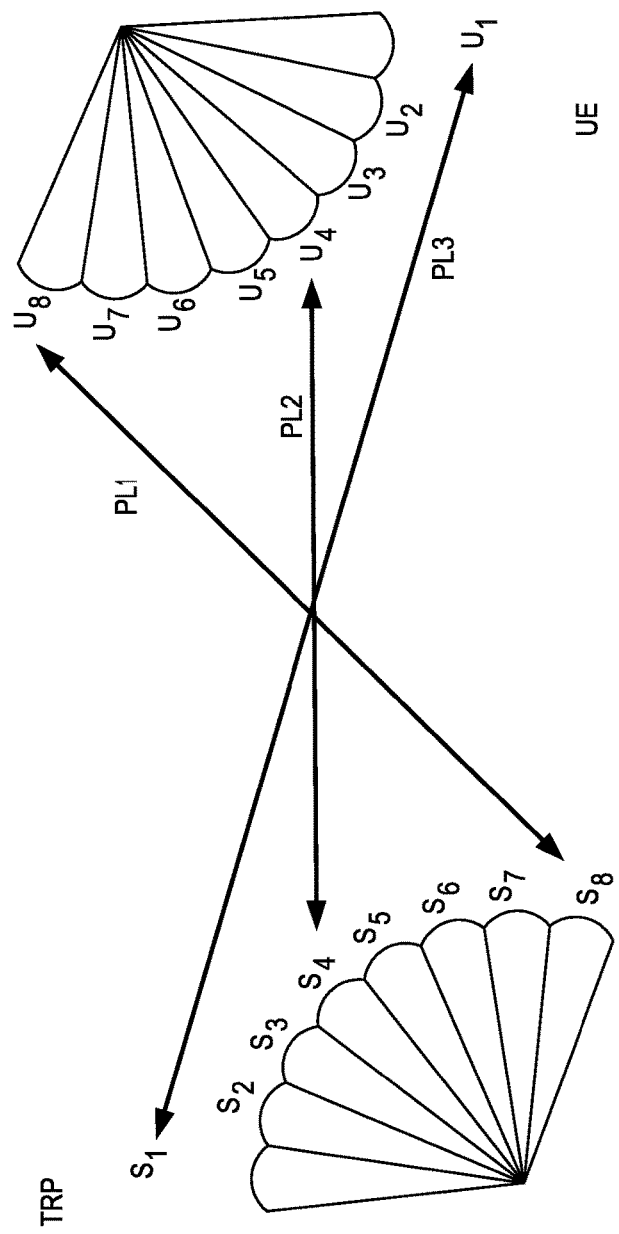
FIG. 1 shows available signal paths between beams of a transmission point (TRP) and beams of a user equipment (UE)

FIG. 1 shows available signal paths between beams of a transmission point (TRP) and beams of the user equipment (UE). The TRP may be a (macro, high power, micro, low power) base station, an eNB, an access point or another transmission point. The UE may be a mobile device such as a mobile phone or a smart phone, a tablet, a hand held device or any other mobile device. The TRP transmits a reference signal in a first link (such as a downlink (DL)) to the UE and the UE transmits data in a second link (such as an uplink (UL)) to the TRP. Each of the antenna arrays (the antenna array of the TRP and the UE) is capable to provide a plurality of beams based on beamforming. For example, the TRP is capable of forming eight beams S1-S8 and the UE is capable of forming eight beams U1-U8. Each, the TRP and the UE, may be capable of forming more or less than the eight beams and the TRP may be capable of forming a different number of beams than the UE. A link can be established between any of these beams.

The beams may be indexed by a beam index or a resource indicator/index. The beams may be indexed with respect to the TRP and the UE. The beam index or resource indicator may be a transmit beam index alone, a receive beam index alone or both a transmit beam index and a receive beam index.

In embodiments some of the downlink reference signal transmit power, downlink reference signal transmit beamforming gain, uplink signal receive beamforming gain and uplink signal target receive power can be signaled or specified together as a single metric.

In various embodiments one of the resource indicators is connected with another one of the resource indicators. The connection can be specified in the settings of the UE and the TRP (e.g., a standard setting), signaled in a Radio Resource Control (RRC) message or provided via a broadcast channel or a physical control channel signal.

In further embodiments the downlink reference signal transmit power is the same for all values of the first resource indicator, and signaled or indicated to the UE without an association with a resource indicator. Moreover, the downlink reference signal transmit beamforming gain is the same for all values of the second resource indicator, and signaled or indicated to the UE without an association the resource indicator. Further, the uplink signal receive beamforming gain is the same for all values of the third resource indicator, and signaled or indicated to the UE without an association with the third resource indicator. Furthermore, the uplink signal target receive power is the same for all values of the fourth resource indicator, and signaled or indicated to the UE without an association with the fourth resource indicator.

In yet other embodiments, the reference signal from the TRP to the UE may be transmitted at the same beam direction where the data transmission is planned to take place from the UE to the TRP (e.g., between beam S4 of the TRP and the beam U4 of the UE). In this case, the path loss is approximately the same in both directions. In yet further embodiments, the reference signal from the TRP to the UE may be transmitted at a different beam direction from the TRP to the UE than the beam direction where the data transmission is planned to take place from the UE to the TRP (e.g., reference signal from beam S1 of the TRP to the beam U1 of the UE and the data transmission between the beam U8 of the UE and the beam S8 of the TPL). In this case, the path losses may be different in the uplink (PL1) and the downlink (PL3). These scenarios will be discussed below.

Figure 2:
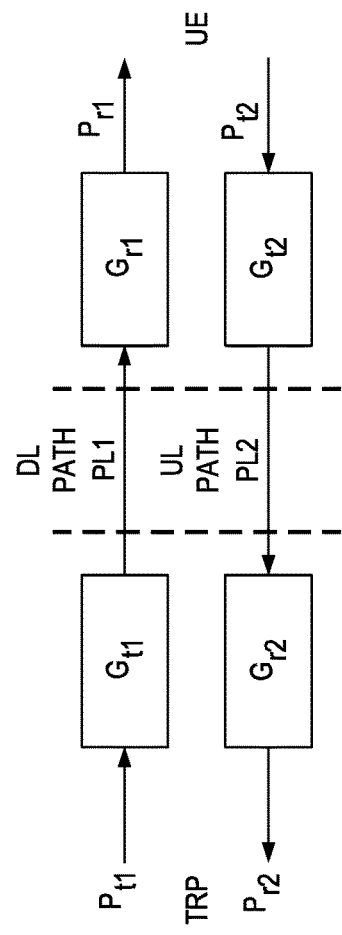
FIG. 2 is a power allocation diagram between a TRP and a UE according to an embodiment.

FIG. 2 shows an uplink/downlink diagram between a TRP and a UE. In the downlink (DL) path, the UE receive power $P_{r1}^{UE}$ can be written as follows: $P_{r1}^{UE} = P_{t1}^{TRP} + G_{t1}^{TRP} + G_{r1}^{UE} - PL_1$, wherein $P_{r1}^{UE}$ is the UE receive power, $P_{t1}^{TRP}$ is the transmit power of the TRP (for DL reference signal transmission), $G_{t1}^{TRP}$ is the TRP transmit beamforming gain and $G_{r1}^{UE}$ is the UE receive beamforming gain, and $PL_1$ is the spatial path loss between the TRP and the UE in the DL path. In the uplink (UL) path, the TRP receive power can be written as follows: $P_{r2}^{TRP} = P_{t2}^{UE} + G_{t2}^{UE} + G_{r2}^{TPE} - PL_2$, wherein $P_{r2}^{TRP}$ is the TRP receive power, $P_{t2}^{UE}$ is the transmit power (for UL data transmission) allocated to (or to be determined at) the UE, $G_{t2}^{UE}$ is the UE transmit beamforming gain and $G_{r2}^{TRP}$ is the TRP receive beamforming gain, and $PL_2$ is the spatial path loss between the UE and the TRP for this path.

From the UE's perspective, the UE transmit power for the UL or data signal can be calculated according to the following formula:

$$P_{t2}^{UE} = P_{r2}^{TRP} + P_{t1}^{TRP} - G_{r2}^{TRP} + G_{t1}^{TRP} - P_{r1}^{UE} - G_{t2}^{UE} + G_{r1}^{UE} + PL_2 - PL_1,$$

wherein $P_{r1}^{UE}$ is the known UE receive power of the reference signal (or DL signal) at the UE;

$G_{t2}^{UE}$ is the known UE transmit beamforming gain (antenna transmission gain) for the data signal (or UL signal) at the UE;

$G_{r1}^{UE}$ is the known UE receive beamforming gain (antenna reception gain) for the reference signal at the UE;

$PL_1$ is the unknown path loss in downlink;

$PL_2$ is the unknown path loss in uplink;

$P_{t1}^{TRP}$ is the unknown TRP transmit power of the reference signal at the TRP;

$P_{r2}^{TRP}$ is the unknown target TRP receive power of the data signal at the TRP;

$G_{r2}^{TRP}$ is the unknown TRP receive beamforming gain (antenna reception gain) for the data signal at the TRP; and $G_{t1}^{TRP}$ is the unknown TRP transmit beamforming gain (antenna transmission gain) for the reference signal at the TRP.

In various embodiments, the TRP transmit power, target receive powers and the TRP transmit/receive beamforming gains or some other combinations of these powers and gains may be signaled to the UE so that the UE can properly calculate or evaluate the transmit power (of the UE) for the data signal to be transmitted to the TRP.

According to embodiments, the path loss for the downlink path and the uplink path are the same, i.e., $PL_1 = PL_2$, then:

$$P_{t2} = G_{r1}^{UE} - P_{r1}^{UE} - G_{t2}^{UE} + P_{r2}^{TRP} + P_{t1}^{TRP} + G_{t1}^{TRP} - G_{r2}^{TRP}$$

According to a first method, the TRP signals to the UE the following:

$P_{r2}^{TRP} = P_0$, wherein $P_0$ is the TRP target receive power;

$P_{t1}^{TRP}$ (the TRP transmit power); and $\Delta_G = G_{t1}^{TRP} - G_{r2}^{TRP}$, the difference between the TRP transmit beamforming gain of the reference (or DL) signal and the TRP receive beamforming gain of the data (or UL) signal. In various embodiments, $P_0$ can be a fixed value. If this is the case, no signaling of $P_0$ to the UE is needed.

These TRP beamforming information sent or signaled to the UE may be signaled separately at different time instants, at different channels or at different frequencies. In various embodiments, the values of the TRP beamforming information may be different for the same UE when sent in different transmission modes. In some embodiments, when the TRP forces $\Delta_G$ to zero, $\Delta_G$ may not explicitly be signaled.

According to a second method, the TRP signals to the UE the following:

$P_{r2}^{TRP} - G_{r2}^{TRP} = P_0 - G_{r2}$, the TRP target receive power with assumed TRP receive beamforming gain of the data (or UL) signal; and $P_{t1}^{TRP} + G_{t1}^{TRP}$, the TRP transmit power and the TRP transmit beamforming gain of the reference (or DL) signal (RS EIRP (effective isotropic radiated power)).

These TRP beamforming information sent or signaled to the UE may be signaled separately at different time instants, at different channels or at different frequencies. In various embodiments, the values of the TRP beamforming information may be different for the same UE when sent in different transmission modes.

According to a third method, the TRP signals to the UE the following:

$P_{r2}^{TRP}=P_0$, wherein $P_0$ is the TRP receive power; $P_{t1}^{TRP}+G_{t1}^{TRP}$, the TRP transmit power and the TRP transmit beamforming gain of the reference (or DL) signal (RS EIRP); and $G_{r2}^{TRP}$, the TRP receive beamforming gain of the UL signal. In various embodiments $P_0$ could be a fixed value. If this is the case, no signaling is needed.

These TRP beamforming information sent or signaled to the UE may be signaled separately at different time instants, at different channels or at different frequencies. In various embodiments, the values of the TRP beamforming information may be different for the same UE when sent in different transmission modes.

According to a fourth method, the TRP signals to the UE the following:

$P_{r2}^{TRP}-G_{r2}^{TRP}=P_0-G_{r2}^{TRP}$, the TRP target receive power with the assumed TRP receive beamforming gain of the data (or UL) signal;

$P_{t1}^{TRP}$, the TRP transmit power; and $G_{t1}^{TRP}$, the TRP transmit beamforming gain of the reference (or DL) signal.

These TRP beamforming information sent or signaled to the UE may be signaled separately at different time instants, at different channels or at different frequencies. In various embodiments, the values of the TRP beamforming information may be different for the same UE when sent in different transmission modes.

In various embodiments, the UE can calculate the UE transmit power ($P_{t2}$) based on the equation of $P_{r2}^{TRP}+P_{t1}^{TRP}+G_{t1}^{TRP}-G_{r2}^{TRP}$. The UE is able to calculate the UE transmit power by any combination of signaling from the TRP. For example, the UE receives only one signaling from the TRP with all the information (TRP signals $P_{r2}^{TRP}+P_{t1}^{TRP}+G_{t1}^{TRP}-G_{r2}^{TRP}$) or the UE receives four signaling messages from the TRP (each information $P_{r2}^{TRP}$, $P_{r1}^{TRP}$, $G_{t1}^{TRP}$ and $G_{r2}^{TRP}$ is individually and separately signaled). Alternatively, the information may be signaled by two or three signaling instances.

According to other embodiments, the path loss for the uplink path and the path loss for the downlink path are different. For example, the reference signal (or DL signal) may be transmitted at a different beam direction between the TRP and the UE than the data signal (or UL signal) planned to be transmitted from the UE to the TRP (see, e.g., FIG. 1, path 1 and path 3). Then, the UE may perform fine tuning for the transmit power of the UE.

In certain scenarios, the UE may provide multiple beams to the same TRP. Along each uplink beam, the transmit beamforming gain of the UE may be different, the receive beamforming gain of the TRP may be different, and the associated path loss between the TRP and the UE may be different. In this case, the transmit power associated with each uplink beam (even if the transmitted signal is exactly the same and has exactly the same error robustness) may be different and may depend on the extended path loss associated with each beam pair link. Here the extended path loss for each beam pair link includes the antenna gain of the TRP, antenna gain of the UE, and the bare path loss between the TRP and the UE without antenna gains in consideration.

The UE may send data frames or a pilot data/control frame to the TRP (the network or another transmission device) using the computed UL transmit power based on any of the aforementioned signaling methods from the TRP and the downlink measurements. The TRP measures the data (or UL) receive power at the TRP and compares the measured receive power against a target receive power (at the TRP). If the difference between the target receive power and the actual receive power is equal or larger than a predefined threshold, beam change is needed. If the difference between the target receive power and the actual receive power is lower than a predefined threshold then the uplink transmit power can be adjusted accordingly (if necessary) and no beam change is required. If the UE transmit power is too large, the UE transmit power is lowered, if it is too low, the power is increased. The UE transmit power may be adjusted iteratively (through several steps). In various embodiments the TRP may send downlink control information (DCI) to the UE to initiate beam change or power adjustment.

Figure 3:
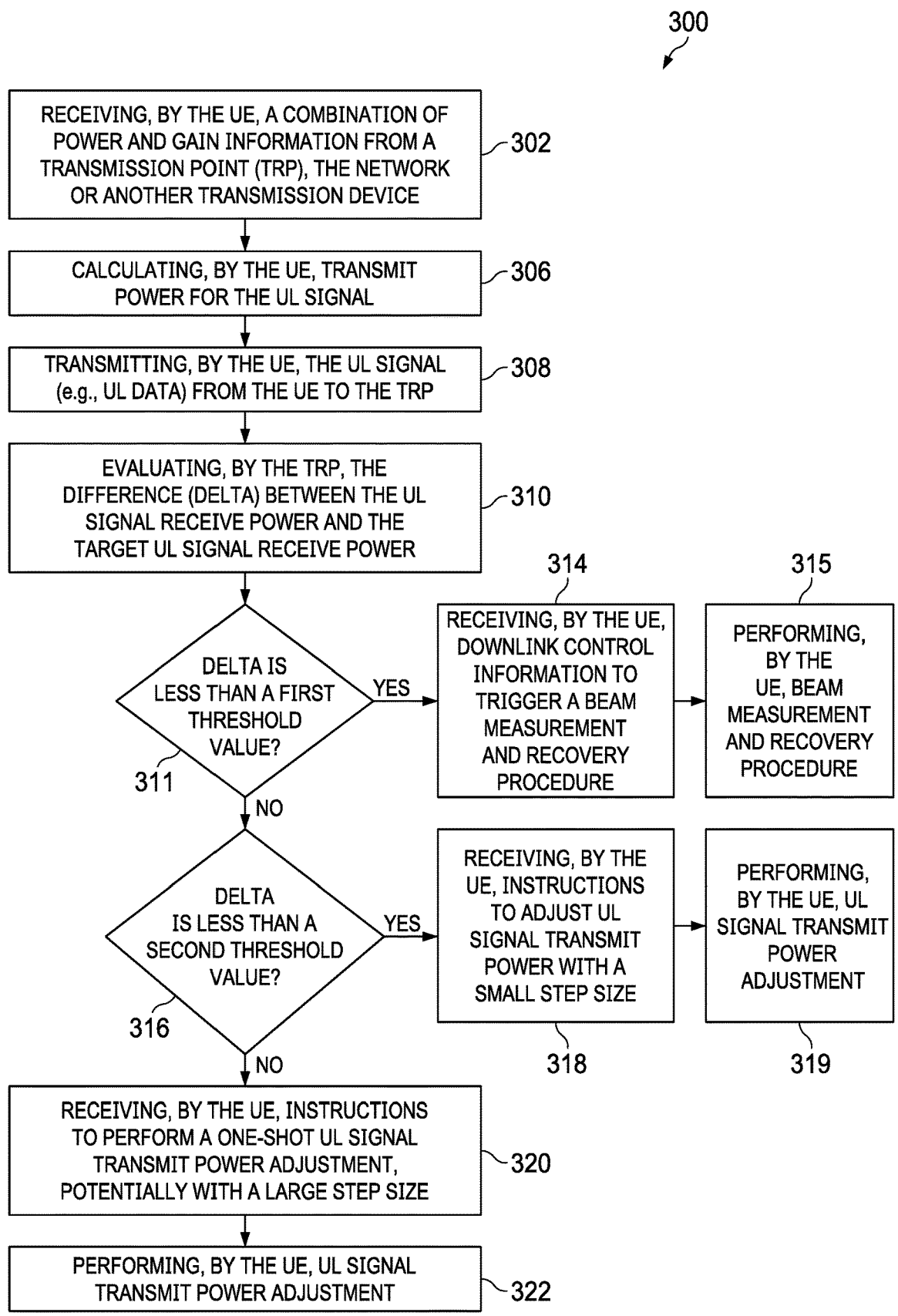
FIG. 3 is a flow chart for calculating the transmit power in the data (or UL) path at the UE according to an embodiment.

FIG. 3 is a flow chart for calculating the transmit power in the data (or UL) path at the UE according to an embodiment. The uplink signal may be an uplink data channel (PUSCH) signal, an uplink control channel (PUCCH) signal, or an uplink random access channel signal.

In a first step, at 302, the UE receives power and gain information sent from a TRP, the network or another transmission device. The combination of power and gain information may include a downlink reference signal transmit power of the TRP, an uplink signal target receive power of the UE, a downlink reference signal transmit beamforming gain of the TRP and an uplink signal receive beamforming gain of the UE. The combination of power and gain information may be signaled from the TRP to the UE. Alternatively, the information may be signaled from the network (e.g., a point different from the TRP) or any other transmission device which wants to communicate with the UE. The information may be received in one, two, three or four individual and separate instances (e.g., signaled by the TRP). In various embodiments, the UE may only receive power information (and no specific beam gain information, e.g., when ΔG=0). Then, the UE knows that there is no beam gain difference.

In the next step, at step 306, the UE calculates according to the various disclosed embodiments, the UL transmit power for data transmission (UL) from the UE to the TRP. At step 308, data (e.g., control data or bearer data) are transmitted from the UE to the TRP with the calculated transmit power. The TRP receives the UL signal with UL signal receive power from the UE.

At step 310, the TRP evaluates a power delta between the uplink signal receive power and the uplink signal target receive power. The delta may be defined as the power difference in the decibel domain, which is equal to the uplink signal receive power (e.g., in dBm) subtracted by the uplink signal target receive power (e.g., dBm). Alternatively, the delta may be defined as a power ratio in the linear domain which is equal to the uplink signal receive power (e.g., in dBm) divided by the uplink signal target receive power (e.g., dBm).

In the next step, at step 312, the TRP evaluates whether delta is less than a predefined first threshold value, threshold_1.

If YES, i.e., if the delta is less than a first predefined threshold value, threshold_1 (typically a negative value in the decibel domain), the TRP may realize that there is significant power undershoot between the TRP and the UE, and may send a beam management, retraining, or fine-tuning signal via DCI (downlink control indicator) at layer 1 or RRC (radio resource control) messages at layer 3. The DCI message may be delivered using a downlink control channel, potentially with a UE-specific reference signal configuration. The UE receives these instructions in step 314. Upon receiving this DCI, the UE may measure downlink reference signals to re-acquire beam information. This is shown in step 315. If a UE-specific reference signal is configured, the UE may measure at least the newly configured reference signal to complete the downlink measurement. Otherwise, the UE may measure some periodic reference signals that have been previously configured, either specifically for the UE, or for a group of UEs with the UE being part of the group.

IF NO, the process moves to decision block 316.

If the delta is less than a second predefined threshold value, threshold_2 (typically a positive value in the decibel domain)(YES), the TRP may realize that there is a slight power mismatch at the UE side, and may send a transmit power adjustment command via DCI (downlink control indicator) format 1 to the UE. The power adjustment command may be represented by several bits. For example, if the power adjustment value is −2 dB, it may be represented by bit '00'; if the power adjustment value is −1 dB, it may be represented by bit '01'; if the power adjustment value is +1 dB, it may be represented by bit '10'; if the power adjustment value is +2 dB, it may be represented by bit '11.' Note that the step size here is typically small, e.g., 1 dB or 2 dB. The UE receives these instructions at step 318 and may adjust the signal transmit power for the UL signal at process step 319. This evaluation is equivalent as if the delta is between a predefined first threshold value, threshold_1, and a predefined second threshold value, threshold_2.

If NO, i.e., if the delta is larger than the second threshold value, threshold_2, the TRP may realize that there is a significant power overshoot and may send out a transmit power adjustment command via DCI format 2. Different from the power adjustment command in the above paragraph, the step size could be quite large. For example, if delta=3, 5, 7 dB (or greater than two but less than 10 dB), then the TRP may send a one-short DCI format 2. The UE receives this command at step 320. In comparison, using DCI format 1, the TRP may provide four shorts DCI commands (−2 dB, −2 dB, −2 dB, −1 dB), assuming DCI format 1 supports step sizes of {2 dB, 1 dB, −1 dB, −2 dB} only. At step 322, the UE adjusts the UL signal transmit power, e.g., by a −7 dB UL power adjustment.

In various embodiments, the UE sends data frames or a pilot data/control frame to the eNB using the computed uplink transmit power $P_{t2}$ from the previous stage. If the frame is a data/control frame the UE relies on HARQ to recover data from potential loss. If the frame is a SRS only, then a SRS-only grant will be given to the UE prior to the adjustment and a data grant will only be given to the UE when the closed loop power adjustment are done.

In various other embodiments, the method 300 may be iterative. For example, the initial adjustment may be a big value and the following adjustments may have smaller values (the value may become smaller every iterative step). In various embodiments a table of DCI values for power adjustments is available.

Figure 4:
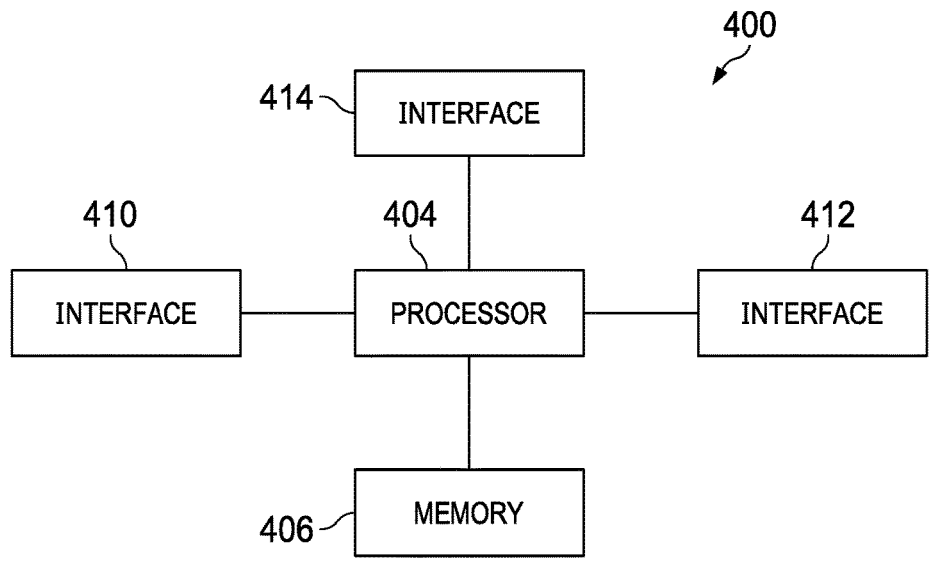
FIG. 4 illustrates a block diagram of an example processing system for performing embodiment methods described herein.

FIG. 4 illustrates a block diagram of an embodiment processing system 400 for performing methods described herein, which may be installed in a TRP or a UE. As shown, the processing system 400 includes a processor 404, a memory 406, and interfaces 410-414, which may (or may not) be arranged as shown in FIG. 4. The processor 404 may be any component or collection of components adapted to perform computations or other processing related tasks, and the memory 406 may be any component or collection of components adapted to store programming or instructions for execution by the processor 404. In an embodiment, the memory 406 includes a non-transitory computer readable medium. The interfaces 410, 412, 414 may be any component or collection of components that allow the processing system 400 to communicate with other devices/components or a user. For example, one or more of the interfaces 410, 412, 414 may be adapted to communicate data, control, or management messages from the processor 404 to applications installed on the UE or a remote device. As another example, one or more of the interfaces 410, 412, 414 may be adapted to allow a user or user device (e.g., hand held device, etc.) to interact/communicate with the processing system 400. The processing system 400 may include additional components not depicted in FIG. 4, such as long term storage (e.g., non-volatile memory, etc.). At least one of the interfaces 410, 412, 414 may be a wireless to air interface.

In some embodiments, the processing system 400 is included in a network device that is accessing, or part otherwise of, a telecommunications network. In one example, the processing system 400 is in a network-side device in a wireless or wireline telecommunications network, such as a base station, a relay station, a scheduler, a controller, a gateway, a router, an applications server, or any other device in the telecommunications network. In other embodiments, the processing system 400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 410, 412, 414 connects the processing system 400 to a transceiver adapted to transmit and receive signaling over the telecommunications network.

Figure 5:
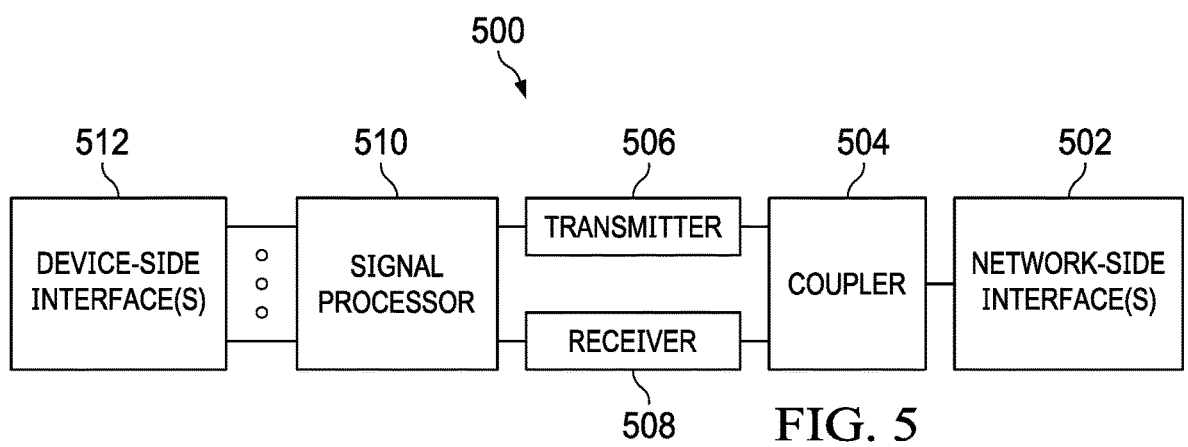
FIG. 5 illustrates a block diagram of an example transceiver adapted to transmit and receive signaling over a telecommunications network.

FIG. 5 illustrates a block diagram of a transceiver 500 adapted to transmit and receive signaling over a telecommunications network. The transceiver 500 may be installed in an n UE or TRP. As shown, the transceiver 500 comprises a network-side interface 502, a coupler 504, a transmitter 506, a receiver 508, a signal processor 510, and a device-side interface 512. The network-side interface 502 may include any component or collection of components adapted to transmit or receive signaling over a wireless or wireline telecommunications network. The coupler 504 may include any component or collection of components adapted to facilitate bi-directional communication over the network-side interface 502. The transmitter 506 may include any component or collection of components (e.g., up-converter, power amplifier, etc.) adapted to convert a baseband signal into a modulated carrier signal suitable for transmission over the network-side interface 502. The receiver 508 may include any component or collection of components (e.g., down-converter, low noise amplifier, etc.) adapted to convert a carrier signal received over the network-side interface 502 into a baseband signal. The signal processor 510 may include any component or collection of components adapted to convert a baseband signal into a data signal suitable for communication over the device-side interface(s) 512, or vice-versa. The device-side interface(s) 512 may include any component or collection of components adapted to communicate data-signals between the signal processor 510 and components within the host device (e.g., the processing system 400, local area network (LAN) ports, etc.).

The transceiver 500 may transmit and receive signaling over any type of communications medium. In some embodiments, the transceiver 500 transmits and receives signaling over a wireless medium. For example, the transceiver 500 may be a wireless transceiver adapted to communicate in accordance with a wireless telecommunications protocol, such as a cellular protocol (e.g., 5G or long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 502 comprises one or more antenna/radiating elements. For example, the network-side interface 502 may include multiple separate antennas or a multi-antenna array configured for multi-layer communication, e.g., multiple input multiple outputs (MIMO), etc. In other embodiments, the transceiver 500 transmits and receives signaling over a wireline medium, e.g., twisted-pair cable, coaxial cable, optical fiber, etc. Specific processing systems or transceivers may utilize all of the components shown, or only a subset of the components and levels of integration may vary from device to device.

In an embodiment a method for controlling an uplink signal transmit power at a user equipment (UE) includes receiving or obtaining, by the UE, a downlink reference signal transmit power associated with a first resource indicator, or a downlink reference signal transmit beamforming gain associated with a second resource indicator, or an uplink signal receive beamforming gain associated with a third resource indicator, and/or an uplink signal target receive power associated with a fourth resource indicator and transmitting, by the UE, an uplink signal associated with a fifth resource indicator to a transmission point (TRP) with a transmit power calculated based on the combination.

In a first aspect of this embodiment one of the first-fifth resource indicator is connected with another one of the first-fifth resource indicator while the connection is specified in settings of the UE and the TRP, and/or signaled in a Radio Resource Control (RRC) message, and/or carried by a broadcast channel or a physical control channel.

In a second aspect of this embodiment the connection between one of the first-fifth resource indicators and another one of the first-fifth resource indicators is a spatial quasi-co-located (QCL) relationship between the signal associated with one of the first-fifth resource indicators and the signal associated with another one of the first-fifth resource indicators.

In a third aspect of this embodiment one of the first-fifth resource indicators is the same as another one of the first-fifth resource indicators.

In a fourth aspect of this embodiment the downlink reference signal transmit power associated with the first resource indicator and the downlink reference signal transmit beamforming gain associated with the second resource indicator are signaled or specified together as a single metric associated with a sixth resource indicator.

In a fifth aspect of this embodiment the one of the first, second or sixth resource indicators is connected with another one of the first, second or sixth resource indicators while a connection is specified in settings of the UE and the TRP, and/or signaled in a RRC message, and/or carried by a broadcast channel or a physical control channel.

In a sixth aspect of this embodiment the connection between one of the first, second or sixth resource indicators and another one of the first, second or sixth resource indicators is a spatial QCL relationship between an antenna port specified by one of the first, second or sixth resource indicators and an antenna port specified by another one of the first, second or sixth resource indicators.

In a seventh aspect of this embodiment one of the first, second or sixth resource indicators is the same as another one of the first, second or sixth resource indicators.

In an eight aspect of this embodiment the downlink reference signal transmit beamforming gain associated with the second resource indicator and the uplink signal receive beamforming gain associated with the third resource indicator are signaled or specified together as a single metric associated with a seventh resource indicator.

In a ninth aspect of this embodiment one of the second, third or seventh resource indicators is connected with another of the second, third or seventh resource indicators while a connection is specified in settings of the UE and the TRP, and/or signaled in a RRC message, and/or carried by a broadcast channel or a physical control channel.

In a tenth aspect of this embodiment the connection between one of the second, third or seventh resource indicators and another one of the second, third or seventh resource indicators is a spatial QCL relationship between an antenna port specified by one of the second, third or seventh resource indicators and an antenna port specified by another one of the second, third or seventh resource indicators.

In an eleventh aspect of this embodiment one of the second, third or seventh resource indicators is the same as another one of the second, third or seventh resource indicators.

In a twelfth aspect of this embodiment the uplink signal receive beamforming gain associated with the third resource indicator and the uplink signal target receive power associated with the fourth resource indicator are signaled or specified together as a single metric associated with an eighth resource indicator.

In a thirteens aspect of this embodiment one of the third, fourth or eighth resource indicators is connected with another one of the third, fourth or eighth resource indicators while a connection is specified in settings of the UE and the TRP, and/or signaled in a RRC message, and/or carried by a broadcast channel or a physical control channel.

In a fourteenth aspect of this embodiment the connection between one of the third, fourth or eighth resource indicators and another one of the third, fourth or eighth resource indicators is a spatial QCL relationship between an antenna port specified by one of the third, fourth or eighth resource indicators and an antenna port specified by another of the third, fourth or eighth resource indicators.

In a fifteenth aspect of this embodiment one of the third, fourth or eighth resource indicators is the same as another one of the third, fourth or eighth resource indicators.

In a sixteenth aspect of this embodiment the uplink signal target receive power associated with the fourth resource indicator and the downlink reference signal transmit power associated with the first resource indicator are signaled or specified together as a single metric associated with a ninth resource indicator.

In a seventeenth aspect of this embodiment one of the first, fourth or ninth resource indicators is connected with another one of the first, fourth or ninth resource indicators while the connection is specified in settings of the UE and the TRP, and/or signaled in a RRC message, and/or carried by a broadcast channel or physical control channel.

In a eighteenth aspect of this embodiment the connection between one of the first, fourth or ninth resource indicators and another one of the first, fourth or ninth resource indicators is a spatial QCL relationship between an antenna port specified by one of the first, fourth or ninth resource indicator and an antenna port specified by another one of the first, fourth or ninth resource indicator.

In a nineteenth aspect of this embodiment one of first, fourth or ninth resource indicators is the same as another one of the first, fourth or ninth resource indicators.

In a twentieth aspect of this embodiment the downlink reference signal transmit power, and/or the downlink reference signal transmit beamforming gain, and/or the uplink signal receive beamforming gain and/or the uplink signal target receive power are signaled at different time instants or with different repetition cycles.

In a twenty-first aspect of this embodiment the uplink signal is an uplink data channel (PUSCH) signal, an uplink control channel (PUCCH) signal, or an uplink random access channel signal.

In a twenty-second aspect of this embodiment any of the first-eighth resource indicators is an index of transmit beam, an index of receive beam, or an index of transmit-receive beam pair associated with a downlink channel, which is a downlink control channel, a downlink data channel, or a downlink broadcast channel.

In a twenty-third aspect of this embodiment any of the first-eighth resource indicators is an index of transmit beam, an index of receive beam, or an index of transmit-receive beam pair associated with an uplink channel, which is an uplink control channel, uplink data channel, or uplink random access channel.

In a twenty-fourth aspect of this embodiment the downlink reference signal transmit power is the same for all values of the first resource indicator, and signaled or indicated to the UE without an association with the first resource indicator.

In a twenty-fifth aspect of this embodiment the downlink reference signal transmit beamforming gain is the same for all values of the second resource indicator, and signaled or indicated to the UE without an association with the second resource indicator.

In a twenty-sixth aspect of this embodiment the uplink signal receive beamforming gain is the same for all values of the third resource indicator, and signaled or indicated to the UE without an association with the third resource indicator.

In a twenty-seventh aspect of this embodiment the uplink signal target receive power is the same for all values of the fourth resource indicator, and signaled or indicated to the UE without an association with the fourth resource indicator.

In a further embodiment method for controlling an uplink signal transmit power at a user equipment (UE) includes transmitting, by the UE, multiple uplink signals to a transmission point (TRP) over multiple beam pair links with the transmit power on each beam pair link being different and dependent on an extended path loss associated with each beam pair link.

In a first aspect of this embodiment the extended path loss for each beam pair link includes an antenna gain of the TRP, an antenna gain of the UE, and a true path loss between the TRP and the UE without antenna gains.

In a second aspect of this embodiment the extended path losses for different beam pair links between TRP and UE are different.

In yet another embodiment a user equipment (UE) comprise a memory storage comprising instructions and one or more processors in communication with the memory storage, wherein the one or more processors execute the instructions to receive or obtain a downlink reference signal transmit power associated with a first resource indicator, and/or a downlink reference signal transmit beamforming gain associated with a second resource indicator, and/or an uplink signal receive beamforming gain associated with a third resource indicator, and/or an uplink signal target receive power associated with a fourth resource indicator and transmit an uplink signal associated with a fifth resource indicator to a transmission point (TRP) with a transmit power calculated based on the combination.

In a further embodiment a method for controlling an uplink signal transmit power at a user equipment (UE) includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the downlink reference signal transmit power associated with the first resource indicator and the downlink reference signal transmit beamforming gain associated with the second resource indicator are signaled together as a single metric associated with a sixth resource indicator.

In a first aspect of this embodiment the first resource indicator and the second resource indicator are signaled together in a Radio Resource Control (RRC) message, carried by a broadcast channel or a physical control channel.

In a second aspect of this embodiment a connection between the first resource indicator and the second resource indicator is a spatial quasi-co-located (QCL) relationship between the signal associated with the first resource indicator and the signal associated with the second resource indicator.

In a third aspect of this embodiment the first resource indicator is the same as the second resource indicator.

In a fourth aspect of this embodiment the downlink reference signal transmit beamforming gain associated with the second resource indicator and the uplink signal receive beamforming gain associated with the third resource indicator are signaled or specified together as a single metric associated with a seventh resource indicator.

In a fifth aspect of this embodiment the uplink signal receive beamforming gain associated with the third resource indicator and the uplink signal target receive power associated with the fourth resource indicator are signaled together as a single metric associated with an eighth resource indicator.

In a sixth aspect of this embodiment the uplink signal target receive power associated with the fourth resource indicator and the downlink reference signal transmit power associated with the first resource indicator are signaled together as a single metric associated with a ninth resource indicator.

In a seventh aspect of this embodiment the uplink signal is an uplink data channel (PUSCH) signal, an uplink control channel (PUCCH) signal, or an uplink random access channel signal.

In another embodiment a method for controlling an uplink signal transmit power at a user equipment (UE) includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the downlink reference signal transmit beamforming gain associated with the second resource indicator and the uplink signal receive beamforming gain associated with the third resource indicator are signaled together as a single metric associated with a sixth resource indicator.

In a first aspect of this embodiment the second resource indicator and the third resource indicator are signaled together in a Radio Resource Control (RRC) message, carried by a broadcast channel or a physical control channel.

In a second aspect of this embodiment a connection between the second resource indicator and the third resource indicator is a spatial quasi-co-located (QCL) relationship between the signal associated with the second resource indicator and the signal associated with the third resource indicator.

In a third aspect of this embodiment the second resource indicator is the same as the third resource indicator.

In a fourth aspect of this embodiment the uplink signal receive beamforming gain associated with the third resource indicator and the uplink signal target receive power associated with the fourth resource indicator are signaled together as a single metric associated with an seventh resource indicator.

In a fifth aspect of this embodiment the uplink signal target receive power associated with the fourth resource indicator and the downlink reference signal transmit power associated with the first resource indicator are signaled together as a single metric associated with an eighth resource indicator.

In a sixth aspect of this embodiment the uplink signal is an uplink data channel (PUSCH) signal, an uplink control channel (PUCCH) signal, or an uplink random access channel signal.

In yet another embodiment a method for controlling an uplink signal transmit power at a user equipment (UE) includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the uplink signal receive beamforming gain associated with the third resource indicator and the uplink signal target receive power associated with the fourth resource indicator are signaled together as a single metric associated with an sixth resource indicator.

In a first aspect of this embodiment the third resource indicator and the fourth resource indicator are signaled together in a Radio Resource Control (RRC) message, carried by a broadcast channel or a physical control channel.

In a second aspect of this embodiment a connection between the third resource indicator and the fourth resource indicator is a spatial quasi-co-located (QCL) relationship between the signal associated with the third resource indicator and the signal associated with the fourth resource indicator.

In a third aspect of this embodiment the third resource indicator is the same as the fourth resource indicator.

In a fourth aspect of this embodiment the uplink signal target receive power associated with the fourth resource indicator and the downlink reference signal transmit power associated with the first resource indicator are signaled together as a single metric associated with an seventh resource indicator.

In a fifth aspect of this embodiment the uplink signal is an uplink data channel (PUSCH) signal, an uplink control channel (PUCCH) signal, or an uplink random access channel signal.

In yet a further embodiment a method for controlling an uplink signal transmit power at a user equipment (UE) includes receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmitting, by the UE, an uplink signal associated with a fifth resource indicator to a transmission point (TRP) with a transmit power calculated based on the combination, wherein the uplink signal target receive power associated with the fourth resource indicator and the downlink reference signal transmit power associated with the first resource indicator are signaled together as a single metric associated with a sixth resource indicator.

In a first aspect of this embodiment the fourth resource indicator and the first resource indicator are signaled together in a Radio Resource Control (RRC) message, carried by a broadcast channel or a physical control channel.

In a second aspect of this embodiment a connection between the fourth resource indicator and the first resource indicator is a spatial quasi-co-located (QCL) relationship between the signal associated with the fourth resource indicator and the signal associated with the first resource indicator.

In a third aspect of this embodiment the fourth resource indicator is the same as the first resource indicator.

In a fourth aspect of this embodiment the uplink signal is an uplink data channel (PUSCH) signal, an uplink control channel (PUCCH) signal, or an uplink random access channel signal.

In various embodiments the user equipment (UE) includes a memory storage comprising instructions and one or more processors in communication with the memory storage, wherein the one or more processors execute the instructions to receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the downlink reference signal transmit power associated with the first resource indicator and the downlink reference signal transmit beamforming gain associated with the second resource indicator are signaled together as a single metric associated with a sixth resource indicator.

In a first aspect of these embodiments the uplink signal receive beamforming gain is the same for all values of the third resource indicator, and signaled or indicated to the UE without an association with the third resource indicator.

In a second aspect of these embodiments the uplink signal target receive power is the same for all values of the fourth resource indicator, and signaled or indicated to the UE without an association with the fourth resource indicator.

In various other embodiments a user equipment (UE) includes a memory storage comprising instructions and one or more processors in communication with the memory storage, wherein the one or more processors execute the instructions to receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the downlink reference signal transmit beamforming gain associated with the second resource indicator and the uplink signal receive beamforming gain associated with the third resource indicator are signaled together as a single metric associated with a sixth resource indicator.

In a first aspect of these embodiments the downlink reference signal transmit power is the same for all values of the first resource indicator, and signaled or indicated to the UE without an association with the first resource indicator.

In a second aspect of these embodiments the uplink signal target receive power is the same for all values of the fourth resource indicator, and signaled or indicated to the UE without an association with the fourth resource indicator.

In various further embodiments a user equipment (UE) includes a memory storage comprising instructions and one or more processors in communication with the memory storage, wherein the one or more processors execute the instructions to: receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the uplink signal receive beamforming gain associated with the third resource indicator and the uplink signal target receive power associated with the fourth resource indicator are signaled together as a single metric associated with an sixth resource indicator.

In a first aspect of these embodiments the downlink reference signal transmit power is the same for all values of the first resource indicator, and signaled or indicated to the UE without an association with the first resource indicator.

In a second aspect of these embodiments the downlink reference signal transmit beamforming gain is the same for all values of the second resource indicator, and signaled or indicated to the UE without an association with the second resource indicator.

In embodiments a user equipment (UE) includes a memory storage comprising instructions and one or more processors in communication with the memory storage, wherein the one or more processors execute the instructions to: receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator and transmit an uplink signal associated with a fifth resource indicator to a transmission point (TRP) with a transmit power calculated based on the combination, wherein the uplink signal target receive power associated with the fourth resource indicator and the downlink reference signal transmit power associated with the first resource indicator are signaled together as a single metric associated with a sixth resource indicator.

In a first aspect of these embodiments the downlink reference signal transmit beamforming gain is the same for all values of the second resource indicator, and signaled or indicated to the UE without an association with the second resource indicator.

In a second aspect of these embodiments the uplink signal receive beamforming gain is the same for all values of the third resource indicator, and signaled or indicated to the UE without an association with the third resource indicator.

In various embodiments, every embodiment can be combined with every aspect of any other embodiment.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for controlling an uplink signal transmit power at a user equipment (UE), the method comprising:
   receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
   transmitting, by the UE, an uplink signal associated with a fifth resource indicator to a transmission point (TRP) with a transmit power calculated based on a combination of the first to fourth resource indictors,
   wherein the downlink reference signal transmit power associated with the first resource indicator and the downlink reference signal transmit beamforming gain associated with the second resource indicator are signaled together as a single metric associated with a sixth resource indicator.

2. The method of claim 1, wherein the first resource indicator and the second resource indicator are signaled together in a Radio Resource Control (RRC) message, carried by a broadcast channel or a physical control channel.

3. The method of claim 2, wherein a connection between the first resource indicator and the second resource indicator is a spatial quasi-co-located (QCL) relationship between the signal associated with the first resource indicator and the signal associated with the second resource indicator.

4. The method of claim 1, wherein the first resource indicator is the same as the second resource indicator.

5. The method of claim 1, wherein the downlink reference signal transmit beamforming gain associated with the second resource indicator and the uplink signal receive beamforming gain associated with the third resource indicator are signaled or specified together as a single metric associated with a seventh resource indicator.

6. The method of claim 1, wherein the uplink signal receive beamforming gain associated with the third resource indicator and the uplink signal target receive power associated with the fourth resource indicator are signaled together as a single metric associated with an eighth resource indicator.

7. The method of claim 1, wherein the uplink signal target receive power associated with the fourth resource indicator and the downlink reference signal transmit power associated with the first resource indicator are signaled together as a single metric associated with a ninth resource indicator.

8. The method of claim 1, wherein the uplink signal is an uplink data channel (PUSCH) signal, an uplink control channel (PUCCH) signal, or an uplink random access channel signal.

9. A method for controlling an uplink signal transmit power at a user equipment (UE), the method comprising:
receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmitting, by the UE, an uplink signal associated with a fifth resource indicator to a transmission point (TRP) with a transmit power calculated based on a combination of the first to fourth resource indicators,
wherein the downlink reference signal transmit beamforming gain associated with the second resource indicator and the uplink signal receive beamforming gain associated with the third resource indicator are signaled together as a single metric associated with a sixth resource indicator.

10. The method of claim 9, wherein the second resource indicator and the third resource indicator are signaled together in a Radio Resource Control (RRC) message, carried by a broadcast channel or a physical control channel.

11. The method of claim 10, wherein a connection between the second resource indicator and the third resource indicator is a spatial quasi-co-located (QCL) relationship between the signal associated with the second resource indicator and the signal associated with the third resource indicator.

12. The method of claim 9, wherein the second resource indicator is the same as the third resource indicator.

13. The method of claim 9, wherein the uplink signal receive beamforming gain associated with the third resource indicator and the uplink signal target receive power associated with the fourth resource indicator are signaled together as a single metric associated with an seventh resource indicator.

14. The method of claim 9, wherein the uplink signal target receive power associated with the fourth resource indicator and the downlink reference signal transmit power associated with the first resource indicator are signaled together as a single metric associated with an eighth resource indicator.

15. The method of claim 9, wherein the uplink signal is an uplink data channel (PUSCH) signal, an uplink control channel (PUCCH) signal, or an uplink random access channel signal.

16. A method for controlling an uplink signal transmit power at a user equipment (UE), the method comprising:
receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmitting, by the UE, an uplink signal associated with a fifth resource indicator to a transmission point (TRP) with a transmit power calculated based on a combination of the first to fourth resource indicators,
wherein the uplink signal receive beamforming gain associated with the third resource indicator and the uplink signal target receive power associated with the fourth resource indicator are signaled together as a single metric associated with an sixth resource indicator.

17. The method of claim 16, wherein the third resource indicator and the fourth resource indicator are signaled together in a Radio Resource Control (RRC) message, carried by a broadcast channel or a physical control channel.

18. The method of claim 17, wherein a connection between the third resource indicator and the fourth resource indicator is a spatial quasi-co-located (QCL) relationship between the signal associated with the third resource indicator and the signal associated with the fourth resource indicator.

19. The method of claim 16, wherein the third resource indicator is the same as the fourth resource indicator.

20. The method of claim 16, wherein the uplink signal target receive power associated with the fourth resource indicator and the downlink reference signal transmit power associated with the first resource indicator are signaled together as a single metric associated with an seventh resource indicator.

21. The method of claim 16, wherein the uplink signal is an uplink data channel (PUSCH) signal, an uplink control channel (PUCCH) signal, or an uplink random access channel signal.

22. A method for controlling an uplink signal transmit power at a user equipment (UE), the method comprising:
receiving, by the UE, a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmitting, by the UE, an uplink signal associated with a fifth resource indicator to a transmission point (TRP) with a transmit power calculated based on a combination of the first to fourth resource indicators,
wherein the uplink signal target receive power associated with the fourth resource indicator and the downlink reference signal transmit power associated with the first resource indicator are signaled together as a single metric associated with a sixth resource indicator.

23. The method of claim 22, wherein the fourth resource indicator and the first resource indicator are signaled together in a Radio Resource Control (RRC) message, carried by a broadcast channel or a physical control channel.

24. The method of claim 23, wherein a connection between the fourth resource indicator and the first resource indicator is a spatial quasi-co-located (QCL) relationship between the signal associated with the fourth resource indicator and the signal associated with the first resource indicator.

25. The method of claim 22, wherein the fourth resource indicator is the same as the first resource indicator.

26. The method of claim 22, wherein the uplink signal is an uplink data channel (PUSCH) signal, an uplink control channel (PUCCH) signal, or an uplink random access channel signal.

27. A user equipment (UE) comprising:
a memory storage comprising instructions; and
one or more processors in communication with the memory storage, wherein the one or more processors execute the instructions to:

receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and transmit an uplink signal associated with a fifth resource indicator to a transmission point (TRP) with a transmit power calculated based on a combination of the first to fourth resource indicators, wherein the downlink reference signal transmit power associated with the first resource indicator and the downlink reference signal transmit beamforming gain associated with the second resource indicator are signaled together as a single metric associated with a sixth resource indicator.

28. The UE of claim 27, wherein the uplink signal receive beamforming gain is the same for all values of the third resource indicator, and signaled or indicated to the UE without an association with the third resource indicator.

29. The UE of claim 27, wherein the uplink signal target receive power is the same for all values of the fourth resource indicator, and signaled or indicated to the UE without an association with the fourth resource indicator.

30. A user equipment (UE) comprising:
a memory storage comprising instructions; and
one or more processors in communication with the memory storage, wherein the one or more processors execute the instructions to:
receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmit an uplink signal associated with a fifth resource indicator to a transmission point (TRP) with a transmit power calculated based on a combination of the first to fourth resource indicators,
wherein the downlink reference signal transmit beamforming gain associated with the second resource indicator and the uplink signal receive beamforming gain associated with the third resource indicator are signaled together as a single metric associated with a sixth resource indicator.

31. The UE of claim 30, wherein the downlink reference signal transmit power is the same for all values of the first resource indicator, and signaled or indicated to the UE without an association with the first resource indicator.

32. The UE of claim 30, wherein the uplink signal target receive power is the same for all values of the fourth resource indicator, and signaled or indicated to the UE without an association with the fourth resource indicator.

33. A user equipment (UE) comprising:
a memory storage comprising instructions; and
one or more processors in communication with the memory storage, wherein the one or more processors execute the instructions to:
receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmit an uplink signal associated with a fifth resource indicator to a transmission point (TRP) with a transmit power calculated based on a combination of the first to fourth resource indicators,
wherein the uplink signal receive beamforming gain associated with the third resource indicator and the uplink signal target receive power associated with the fourth resource indicator are signaled together as a single metric associated with an sixth resource indicator.

34. The UE of claim 33, wherein the downlink reference signal transmit power is the same for all values of the first resource indicator, and signaled or indicated to the UE without an association with the first resource indicator.

35. The UE of claim 33, wherein the downlink reference signal transmit beamforming gain is the same for all values of the second resource indicator, and signaled or indicated to the UE without an association with the second resource indicator.

36. A user equipment (UE) comprising:
a memory storage comprising instructions; and
one or more processors in communication with the memory storage, wherein the one or more processors execute the instructions to:
receive a downlink reference signal transmit power associated with a first resource indicator, a downlink reference signal transmit beamforming gain associated with a second resource indicator, an uplink signal receive beamforming gain associated with a third resource indicator, and an uplink signal target receive power associated with a fourth resource indicator; and
transmit an uplink signal associated with a fifth resource indicator to a transmission point (TRP) with a transmit power calculated based on a combination of the first to fourth resource indicators, wherein the uplink signal target receive power associated with the fourth resource indicator and the downlink reference signal transmit power associated with the first resource indicator are signaled together as a single metric associated with a sixth resource indicator.

37. The UE of claim 36, wherein the downlink reference signal transmit beamforming gain is the same for all values of the second resource indicator, and signaled or indicated to the UE without an association with the second resource indicator.

38. The UE of claim 36, wherein the uplink signal receive beamforming gain is the same for all values of the third resource indicator, and signaled or indicated to the UE without an association with the third resource indicator.

* * * * *